Figure 3:
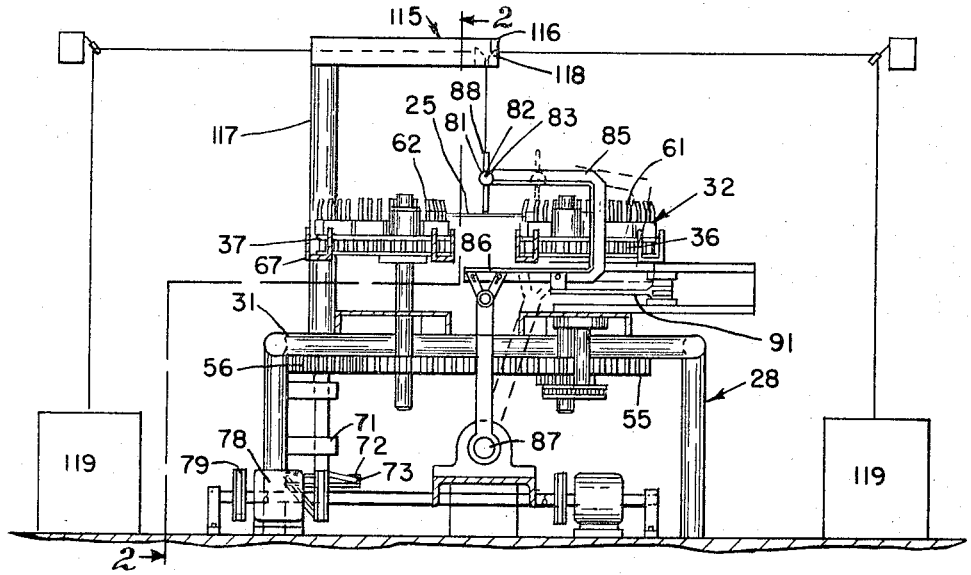

Oct. 3, 1967     L. GIDGE ETAL     3,345,231
APPARATUS AND METHOD FOR MAKING NON-WOVEN NETTING
Filed March 6, 1964     3 Sheets-Sheet 1
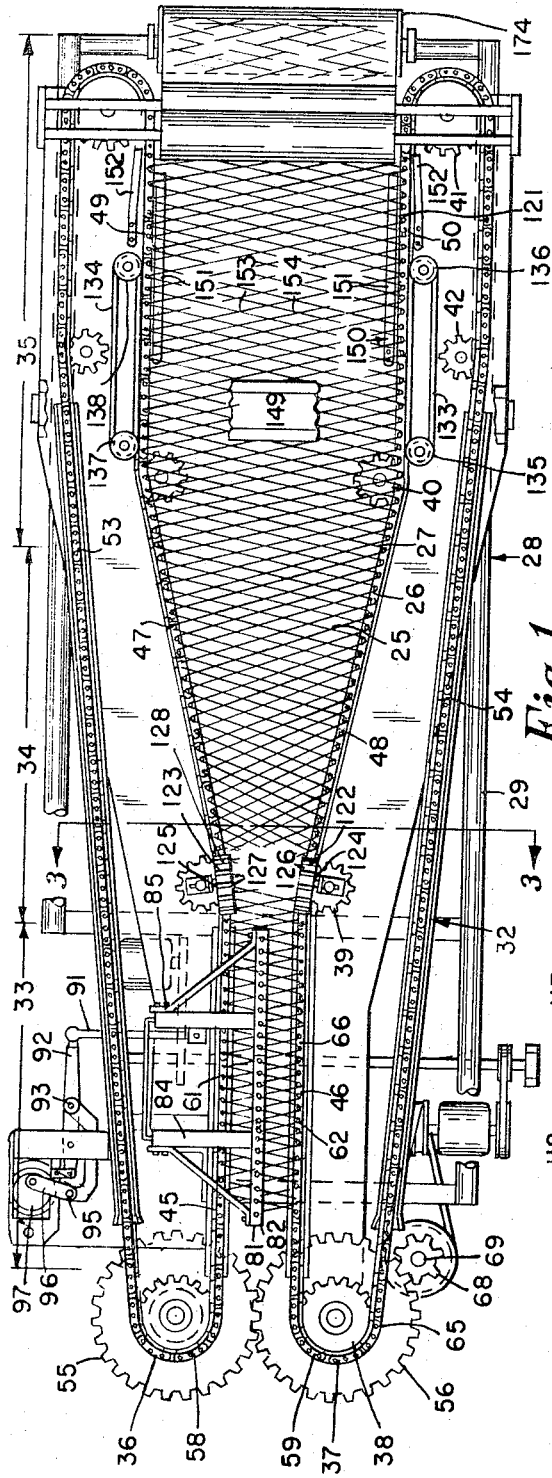
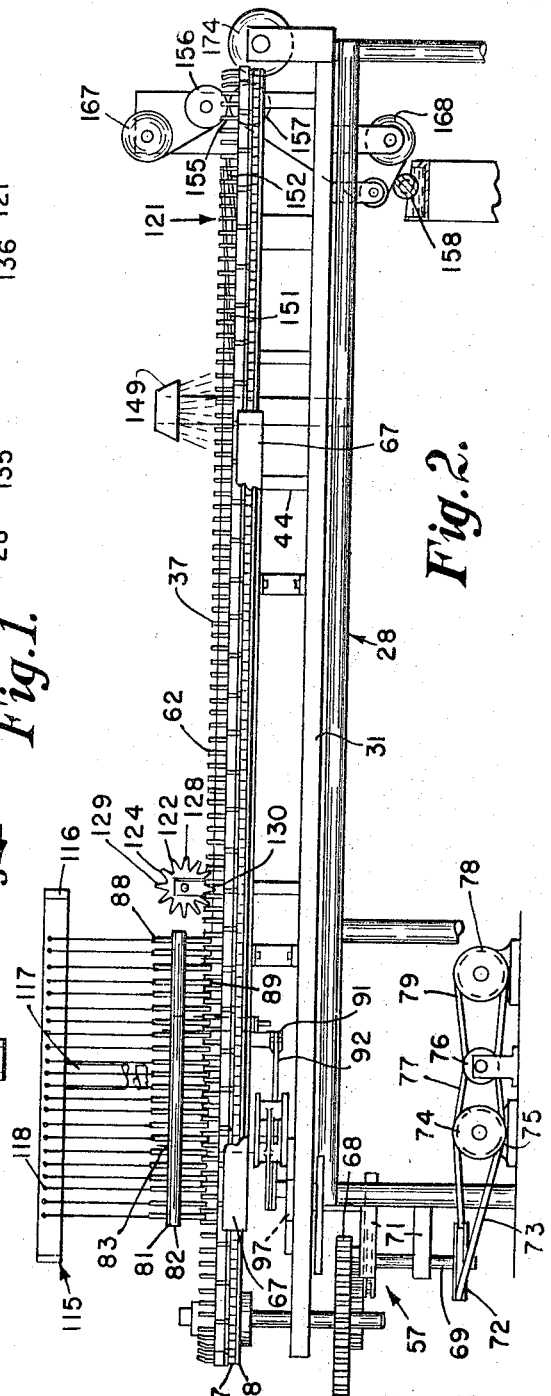
INVENTOR.
LESTER GIDGE
VALMOR R. POULIN JR.
BY Pearson + Pearson
ATTORNEYS Oct. 3, 1967    L. GIDGE ETAL    3,345,231
APPARATUS AND METHOD FOR MAKING NON-WOVEN NETTING
Filed March 6, 1964    3 Sheets-Sheet 2

INVENTOR.
LESTER GIDGE
VALMOR R. POULIN JR.
BY Pearson & Pearson
ATTORNEYS

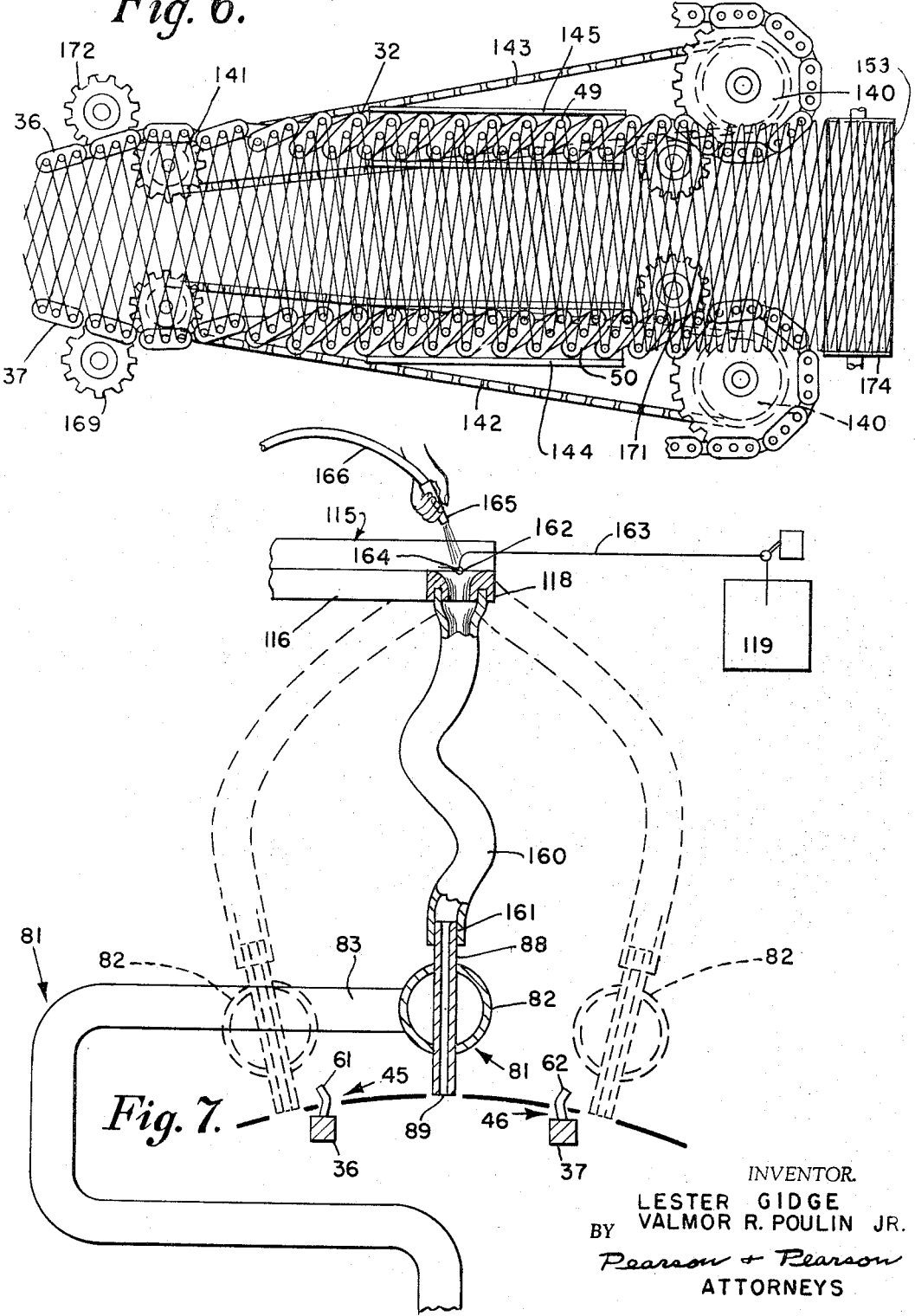

United States Patent Office 3,345,231
Patented Oct. 3, 1967

3,345,231
APPARATUS AND METHOD FOR MAKING
NON-WOVEN NETTING
Lester Gidge and Valmor R. Poulin, Jr., Nashua, N.H., assignors to Union Carbide Corporation, a corporation of New York
Filed Mar. 6, 1964, Ser. No. 349,931
21 Claims. (Cl. 156—181)

This invention relates to an improved apparatus and method for making non woven, open meshed netting of the type used as a reinforcement between layers of adhered paper.

Such netting is not interlaced, as in a woven fabric, but resembles a grille or lattice having a plurality of parallel strands all in a common plane and crossed by a plurality of other parallel strands all in a common plane. The angularly disposed criss-cross strands can be bonded to each other at their crossing points, for use for example, as onion bag net or the like, but when the end product is a reinforcement adhered and clamped between upper and lower webs of paper, such bonding is not necessary or desirable.

A number of devices have been disclosed in prior patents for forming rectangular grilles of reinforcing strands for the purpose, usually consisting of parallel, continuous, longitudinal strands fed from a roll, or warp, and successive, individual, lateral strands laid across the longitudinal strands and then cut off to the desired length. Exemplary of such devices are those shown in U.S. Patent 1,368,588 to Wandel of Feb. 15, 1921 wherein an obliqued endless member clamps the end of a lateral strand, draws it across the parallel strands and then cuts the strand. A pair of rotating clamp wheels revolve in a horizontal plane above the advancing longitudinal strands for cutting off individual lateral strands in U.S. Patent 1,015,174 to Gueffroy of Jan. 16, 1912.

The apparatus of this invention is of the type shown in U.S. Patent 1,211,851 to Howard of Jan. 9, 1917 or in U.S. Patent 2,812,797 to Estee of Nov. 12, 1957 in that an oscillating yarn feed member alternately deposits the yarns first around upstanding pins on one travelling member and then around upstanding pins on a parallel travelling member, to form a criss-cross mesh.

Despite the many patents of the prior art, so far as applicants are aware, the conventional apparatus now in use for making such netting is of the type shown in the Gueffroy patent, the rotating clamping and cutting members having many parts, being relatively costly and cumbersome, slow in speed and subject to occasional down time for repair. The devices of the oscillating, yarn looping, guide and upstanding pin conveyor type have usually been impositive in operation with the loops dropped onto the pins, or the pins raised to receive the loops. The yarn looping guides have been in multiple parts with moving, rather than fixed pivots, and with complicated travel paths and the path of travel of the oscillating guides have been the full width of the end product, thereby slowing operation.

It is the principal object of this invention to provide a simple, low cost, apparatus and method for making non woven netting at high speed by means of the rapid positive looping action of a multiple strand looping member oscillating on a fixed pivot axis while reciprocating along said axis.

Another object of the invention is to provide a pair of closely spaced pin carrying conveyors and a multiple strand, looping member oscillating on a pivot axis below the centre of the rectilinear plane of the pair of conveyors, the yarn guides on the member having a path coplanar with the rectilinear path of the pins at each opposite end, so that each yarn is actually wrapped around a pin rather than dropped, or otherwise impositively deposited therearound.

Another object of the invention is to provide apparatus for creating a multiplicity of small meshes in a multiplicity of criss-cross strands during short strokes of an oscillating member, the strands and mesh being later spread out to full size in a simple expansion step.

A further object of the invention is to provide a plurality of parallel advancing pins and a plurality of oscillating strand feed guides for simultaneously looping a multiplicity of individual strands around the advancing pins whereby each back and forth cycle of the guides creates a narrow elongated web of netting adapted to be spread to a wide netting of identical length.

Still another object of the invention is to provide a novel mechanism for looping strands around parallel rows of advancing pins in the form of an oscillating member having fifty or more strand guides, the guides traversing back and forth from one row of pins to the other, but accelerating at the end of each stroke to loop the strands rapidly around the pins as the pins continually advance at relatively high speed.

A still further object of the invention is to provide a pair of endless members having stretches advancing in the same direction with spaced cylindrical upstanding pins thereon, a criss-cross netting being formed on the stretches when closely spaced, the stretches then diverging to pull the strands around the pins into a wider web and the wider web then being stripped from the pins into a nip formed by opposed webs of adhesive coated paper to form a reinforced paper sandwich.

Figure 4:
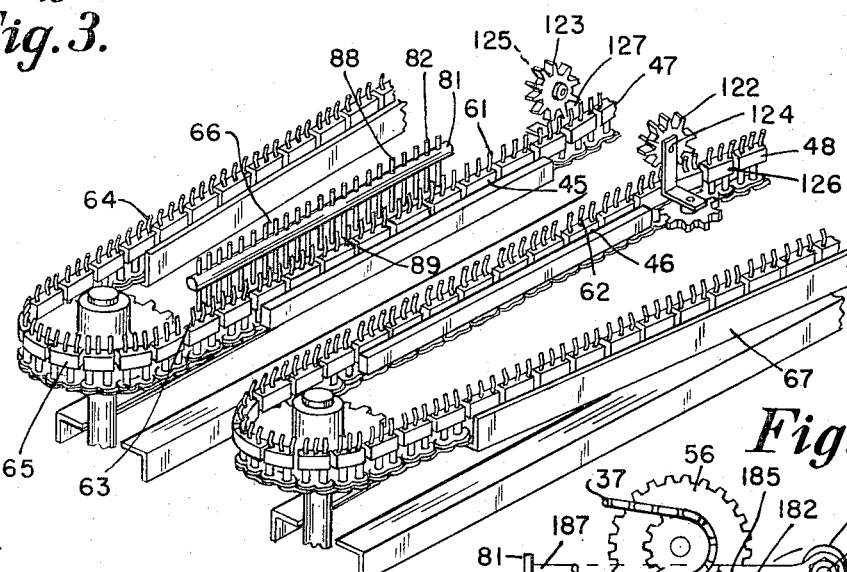
Figure 5:
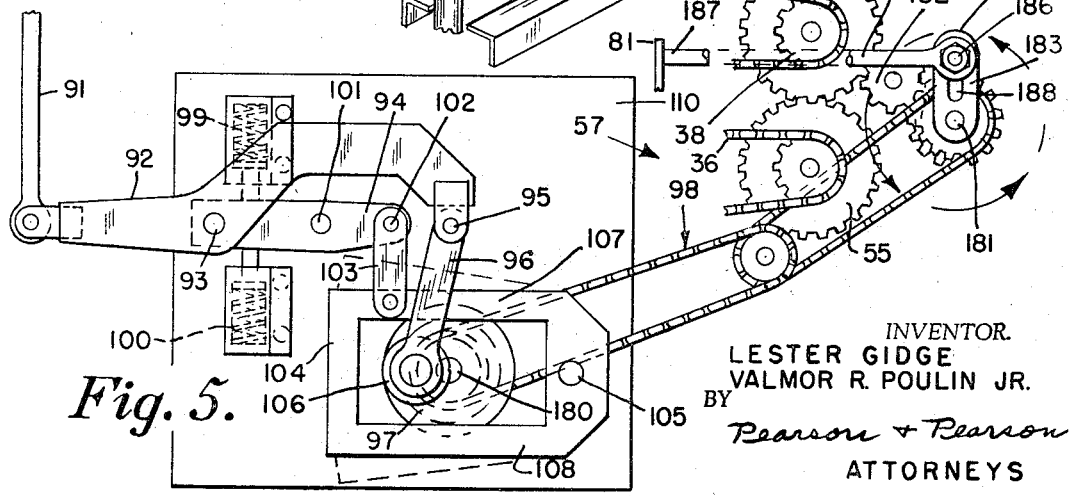

Other objects and advantages of the invention will be apparent from the claims, the description of the drawings and from the drawings in which:

FIGURE 1 is a plan view of a preferred embodiment of the apparatus of the invention, in section on line 1—1 of FIG. 3, FIGURE 2 is a side elevation in section on line 2—2 of FIG. 3, FIGURE 3 is an end view in section on line 3—3 of FIG. 2, FIGURE 4 is an enlarged, fragmentary, perspective view showing the traversing member looping a plurality of strands around upstanding elements advancing along a path, FIGURE 5 is an enlarged fragmentary detail plan view of the mechanism for rapidly looping the strands around the advancing yarn receiving elements, FIGURE 6 is an enlarged fragmentary plan view showing the crowding of the chain links for reducing mesh size, and FIGURE 7 is an enlarged end view, in section, showing the preferred means for rethreading a broken strand or replenishing a spent strand.

As shown in FIGURE 1, the apparatus and method of this invention are mainly for the purpose of producing, at low cost and relatively high speed, the non woven, open meshed netting 25. The criss-cross strands such as 26 and 27 of netting 25 are not interlaced but instead all of the strands 26 running in one direction are in a common plane, and all of the other strands 27 running in the other direction are also in a common plane, the latter plane being different from the former plane. Unlike conventional similar material used as a reinforcement layer between upper and lower layers of adhesive coated paper, the strands 26 and 27 do not form a rectangular grille but rather, are angularly disposed to each other to form a lattice-like pattern of diamond or parallelogram shaped meshes. The strands are thus biased, or obliqued, to the longitudinal dimension of the netting for additional strength as a reinforcement.

The machine 28 includes a suitable frame 29, having a horizontal table 31 which supports the endless strand carrier means 32, the latter extending along a horizontal path through a looping zone 33, a spreading zone 34 and a stripping zone 35. Carrier means 32 is preferably in the form of a pair of endless continuous members, each forming a closed loop in a plane common to both and preferably comprising link chains 36 and 37 each trained around sprockets such as 38, 39, 40, 41 and 42, the sprockets being rotatable in the said common plane on axes normal thereto in bearings such as 44 mounted in table 31.

The chains 36 and 37 are arranged to form a pair of closely spaced, generally parallel stretches 45 and 46, about six to ten inches apart, in the looping zone 33, a pair of diverging stretches 47 and 48, in the spreading zone 34, and a pair of widely spaced, generally parallel stretches 49 and 50 in extension of the divergent stretches and in the stripping zone 35. All of these stretches advance unidirectionally and in the same general direction from one end of the machine to the other, there being return stretches 53 and 54.

A pair of intermeshed drive gears 55 and 56, each rotating one of the sprockets 38 of each chain 36 or 37, form part of the power mechanism 57 of the machine and assure that the links such as 58 or 59 of each chain advance in synchronization with each other.

A plurality of loop receiving elements 61 or 62 are mounted at spaced equal distances along each chain 36 or 37, each element being normal to the plane of the chains. Preferably the elements 61 and 62 are in the form of upstanding pins of hooked, or curved, configuration, which, when travelling along the stretches 45, 46, 47, 48, 49 and 50, have their intermediate portions 63 curved inwardly toward the pins on the opposite stretch and their terminal tips 64 diverging away from the pins on the opposite stretch to thereby prevent dislodgement of loops carried on the pins. It has been found convenient to provide a plate 65, coextensive in length with each link, and pivotally connected to the chain in the same manner as the link, each plate 65 having three upstanding pins thereon, the plates and pins being arranged to create spaces 66 between pins all of which spaces are identical in length. The loop receiving elements thus are generally normal to the common plane in which both endless members 36 and 37 are located.

Preferably the under portion of each chain 36 and 37 is supported and guided in channel pieces such as 67 to prevent downward sag or inward yielding of the chains and pins. Drive gear 56 meshes with a gear 68 carried by a vertical shaft 69, mounted in suitable bearings 71, shaft 69 having a pulley 72 driven by belt 73 from pulley 74 on gear reducer 75. Reducer 75 is driven from jack shaft 76 through power train 77 and jack shaft 76 is driven by electric motor 78 through power train 79. The closely spaced pair of chains 36 and 37, with their upstanding pins, thus travel through the looping zone 33, in parallelism and in a single horizontal rectilinear plane so that the pins may simultaneously receive multiple loops alternately on each opposite side under uniform tension. The spacing of chains 36 and 37 in looping zone 33 is substantially less than the full width of the end product.

A strand looping member 81 is mounted in the looping zone 33, the member 81 having a longitudinally extending bar, tube or other rigid support 82 in parallelism with the chains 36 and 37 in the zone 33 and slightly above the plane of the pins at the mid point of its stroke. The bar 82 is supported at the terminal ends 83 of a pair of arms 84 and 85 which extend outwardly, downwardly, inwardly and downwardly again to terminal lower ends such as 86 oscillatably mounted in suitable bearings 87, constituting a pivot axis below the longitudinal centre line of the pair of chains 36 and 37. The member 81 has no telescopable, or other moving, parts and is unitary, in the embodiment illustrated and the bar 82 traverses back and forth in a single arcuate plane of uniform radius, which is a short angular portion of a circle.

As illustrated the looping member 81, while oscillating on a fixed, horizontal pivot axis in bearings 87, is also longitudinally translatable back and forth along the axis in a manner described hereinafter. As best shown in FIGURE 7, one opposite terminal end of the curvilinear path of the feed guides, depending from bar 82, passes between the upstanding pins 61 on stretch 45 of chain 36 to a position beyond and outside the pins, then back between the pins 61, always co-planar therewith for positive looping of threads around the pins. The other end of the path is identical in passing between the pins 62 on stretch 46 of chain 37 always co-planar therewith. The mid portion of the curved path is above the plane of the previously laid strands to avoid contact of the same by the strands being looped in the next portion of the stroke.

In order to secure a commercially acceptable, relatively high speed production of the end product, multiple strand feed guides are provided on bar 82, for cooperation with the closely spaced, parallel, advancing rows of pins 61 and 62.

Fifty, to seventy-five, strand feed guides 88 are equally spaced along the bar 82, the spacing of the guides being identical with the spacing of the pins 61 and 62 in order to permit the guides to pass through the spaces 66. Preferably each guide 88 is in the form of a tube having a lower strand delivery end 89 which is just below the level of the curved portions 63 of the pins when at the end of the stroke of the bar 82 just outside the row of pins. The closely spaced parallel stretches 45 and 46 are continuously advancing at relatively high speed for this type of apparatus, for example 250 feet per minute, so that the multiplicity of guides 88 pass through spaces 66 between pins 61 on the outward part of the stroke of bar 82 and then pass through the next successive set of spaces between pins on the return, inward stroke while each strand is looped around a pin. During the remainder of the stroke, the pins continue to advance, so that upon the bar 82 arriving at the other terminus of its stroke a set of pins 62, somewhat in rear of the said pins 61 are each looped with a strand, this creating the diamond shaped pattern of netting 25. Because the stretches 45 and 46 are closely spaced, this criss-cross looping is rapidly performed with a short stroke of bar 82.

The power mechanism 57 includes the cam system, best shown in FIGURE 5, for driving the bar 82 and accelerating its looping operation at the terminal end of each stroke. As shown the bar 82 is connected by a link 91 to the lever 92, the lever being pivoted at 93 to the support arm 94 and having its opposite end 95 connected by the crank arm 96 to the rotating crank wheel 97. Wheel 97 is driven in synchronization with the chains 36 and 37 by means of a power train 98 connected to the shaft of gear 56.

The support arm 94 is mounted on a fixed pivot 101 and its other end 102 is connected by a link 103 to a yoke 104 surrounding crank wheel 97, the yoke being mounted on a fixed pivot at 105. An element 106 is carried by the crank arm 96 and so arranged as to engage the yoke at each opposite side 107 or 108 thereof with each revolution of wheel 97. Thus the oscillation of bar 82 is performed by the rotation of the wheel 97, but near the end of each back and forth stroke the yoke is moved sidewise to accelerate the movement of the guides into and out of the path of the pins.

The roller element 106 is located under the pivot connection of the crank arm 96 to the crank wheel 97 so that it urges the yoke outwardly at each opposite end of the crank stroke. A pair of springs 99 and 100 are provided, each operable on an opposite side of arm 94, to keep the arm spring centered until the roller element 106 actuates the yoke and to then act as return springs for rapid actuation. A plate 110 is provided on which the pivot pins 101 and 105 are fixed.

The power train 98 of power mechanism 57, leads from the vertical crank shaft 180, to the vertical crank shaft 181, the latter being driven by the gear 182 from chain gear 56 so that the drive of the chains and the travel of member 81 are in synchronization. Crank shaft 181, carries a crank arm 183 having one terminal end 184 of the drive link 185 pivoted thereto at 186. The other end 187 of link 185 is connected to the member 81, which member is slidably mounted in bearings 87 to move back and forth through a short stroke along the longitudinal centre line of the machine. Crank arm 183 includes a slot 188, for a suitable clamp nut on the end 184 of link 185 so that the link can be adjusted along the slot to vary the effective stroke of the link. The stroke of crank arm 96 is similarly adjustable by known means, not shown, to vary its length of stroke.

It will be seen that as the crank arm 183, rotates counter clockwise in the direction of the arrow, from 3 o'clock to 12 o'clock, it is moving members 81 and 82 forwardly in the direction of advance of the chains at increasing speed. Meantime the member 82 is moving from one chain transversely toward the other chain. As the guides of member 82 are about to pass through the spaces 66 between the chain pins, the crank arm 183 is approaching 12 o'clock whereby the guides and the pins are advancing at about the same speed. The cam system, through link 91, then accelerates the travel of the guides through the pins to outside the pins, whereupon the crank arm 183 passes the 12 o'clock point and commences to slow down. This permits the guides to move around the pins, to the spaces in rear thereof and then to accelerate back in the opposite transverse direction through the spaces. As the member 81 continues across the space between the chains, the crank arm 183 travels through 9 o'clock and 6 o'clock back to 3 o'clock, just as the guides approach the chain on the opposite side. The cycle is then repeated.

If the length of the member 82 is termed $a$, the gear ratios are so adjusted that with one full turn of crank shaft 181, the chains will have advanced ½$a$, crank shaft 180 will have made a half turn and the member 82 will have crossed over one chain and wrapped the loops around the pins on the chain. With the next full turn of crank shaft 181 the chains will have advanced ½$a$, the member 82 will have crossed over to the opposite chain and will have wrapped the loops around the pins thereon and crank shaft 180 will have completed its second half turn. The apparatus can be so finely adjusted that the guides are in wiping contact with their respective pins as they round the same.

The strand supply means 115 of the invention, unlike many devices of the prior art, is not required to be carried on a moving part of the apparatus or even on a fixed part of the frame where it might interfere with operation. Strand supply means 115 includes the distributor head 116 mounted on a post 117, supported on table 31, at a level well above the endless carrier means 32, the head 116 having a multiplicity of spaced, strand guiding elements 118 corresponding in number to the number of strand feed guides on the bar 82, which may be fifty or more. At a distance of five to ten feet from each opposite side of machine 28, and at any desired level, for example floor level, a corresponding number of large packages, or cheeses, 119 each containing a continuous wound strand such as 26 or 27, are mounted. A strand from each cheese 119 passes through an element 118 and a strand feed guide 88 on bar 82, and is freely withdrawable from the cheese, or package, as criss-cross looping results in the continual formation of netting 25.

When the netting 25 reaches the divergent stretches 47 and 48, in spreading zone 34, having been made by the traverse of bar 82 in short strokes between closely spaced parallel stretches 45 and 46, the strands looped around the elements 61 and 62 are progressively pulled around the pins and drawn from strand supply means 115 as the opposite rows of pins spread further apart until a desirable full width of netting 25 is achieved, as at 121. The full width netting 121 then progresses along the widely spaced parallel stretches 49 and 50 in the stripping zone 35.

It has been found desirable to provide a pair of hold-down rolls 122 and 123, each freely rotatable on suitable bearings 124 and 125 supported on table 31, and each located at the junction 126 or 127 of each stretch 45 or 46 with the divergent stretch 47 or 48 in extension thereof. Each roll 122 or 123 preferably has a toothed circumferential face 128, each tooth 129 being arranged to enter a space 66 between adjacent pins 61 or 62 to engage the looped portions 130 of the strands thereon to prevent dislodgment of the loops in travelling around the angled path at the junctions 126 and 127.

Preferably also, a pair of elongated, belts 133 and 134 of soft yieldable material such as rubber, felt, hair or pile fabric are mounted, each on an opposite side of the widely spaced parallel stretches 49 and 50, where the strands have come to their final length and have only forward motion. The belts 133 and 134 are trained around suitable pulleys 135, 136, 137 and 138 so that the inside stretches freely advance alongside the outside of the chain pins 61 or 62, in contact with the looped portions 130 of the strands thereon, to eliminate any pull on the strands back to the cheeses 119. By adjusting the contact pressure of the belts on the strands, tension can be increased or decreased as desired.

As best shown in FIGURE 6, because of the pivoted link, pivoted plate, chain construction of the endless carrier means 32 and the channel pieces 67, the links and plates in each stretch 49 and 50 may be folded, or crowded together in the stripping zone 35, to provide a finer mesh. A suitable number of extra links are provided in each chain and the sprockets such as 140 and 141 at each end of each stretch are interconnected by the chains 142 and 143 to rotate in a predetermined relationship. Thus as the links pass through the stretch, the predetermined slack of the links extending between the sprockets is constantly maintained and the links are crowded or folded into less length and greater width in the channel pieces 144 and 145. The pins on the links are thus moved more closely together longitudinally resulting in a finer mesh in the netting.

Proximate the end of stripping zone 35 strand stripping means 150 is provided, means 150 preferably consisting of a pair of members 151 and 152, arranged to converge each stretch 49 and 50 to release tension on the strands to permit the loops to slide off the pins. As shown, member 151 is fixed to table 31 to engage the inside of a stretch to maintain the desired lateral spacing of the netting through the major portion of zone 35. Member 152, which may be a fixed arm, or a rotatable sprocket, is mounted on the outside of the stretch to urge it inwardly toward the opposite stretch and thereby relieve tension for stripping of the loops. The loops may be transferred to pins on other chains, or if the crossing points of the strands as at 153 and 154 have been adhered or heat fused to each other by the heating means 149 to form onion bag material or similar netting, the resulting fabric may be wound up on a suitable roll.

However, where the netting 25 is to be a laminated reinforcement in a paper tape, an upper roll 167 and a lower roll 168 of paper are mounted proximate the end of the stripping zone to form a nip 155 for receiving the netting. Suitable roll guides 156 and 157 and adhesive coaters 158 are provided to cause the adhesive coated webs to firmly clamp the reinforcing netting and thereby produce criss-cross strand reinforced material.

The stripping members 152 are inclined upwardly so that in addition to relieving tension on the netting, the inclined faces of the members 152 lift the loops off the pins as the netting enters nip 155 to become a reinforcement in the web wound on roll 174.

As shown in FIGURE 7, a flexible tube 160 preferably connects each fixed strand guide element 118 with the upper rim 161 of one of the moving feed guides 88 on the looping member 82. In the event of a break in one of the strands, or when it is desired to thread the end 162 of a new strand 163 from a package 119 into one of the guides 88, a small knot 164 is tied in the end 162 and the knot 164 blown through the flexible tube and through the guide by air pressure from the nozzle 165 of an air pressure hose 166. This can be done at any time, while the element 82 is moving because the distributor head 116 is stationary. The end 162 will catch on the chain pins and be incorporated into the product.

As shown in FIGURE 6, when it is desired to crowd the links of the chains 36 and 37 in the zone 35, sprockets such as 169, 170, 171 and 172 are provided to prevent the chains 36 and 37 from jumping off the sprockets 140 and 141.

The criss-crossed strands such as 26 and 27 may be of any desired material, for example natural or synthetic fibres, such as yarns, mono and multi filaments, fibreglass, wire or the like depending on the end use, the tearability of any paper laminations used therewith and other factors. If of wire, the strands can be joined at their crossing points by a shower of solder in zone 35. The chains 36 and 37, can extend along each opposite side of a travelling paper making wire to incorporate the mesh in the paper pulp and then strip the mesh from the pins.

It should be noted that the end product of this invention has not been formed by strands wrapped unidirectionally around a stationary form such as the cylinder of the Hirschy Patent 2,902,395 of Sept. 1, 1959 or the pair of stationary parallel arms of the Currier Patent 1,460,949 of July 3, 1923. Such winding tends to impart twist to the strands while tending to frictionally bind or snub the strands on the stationary form. Such winding also requires a rotating twister head carrying a full supply of strand material and tending to be cumbersome and weighty, especially if fifty or more individual strands are used as in this invention. By using travelling members as the form and simply laying the multiple strands back and forth between the members, the strand supply is supported away from the machine, there is no accumulation of unidirectional twist in the fabric and no misspacing due to frictional bind.

A typical embodiment of this invention might have a looping element 82, fifty four inches long, with feed guides spaced one inch apart, totalling 54 guides, and the chain pins spaced at one inch apart. When the lineal speed of the chains is 100 feet/min., the traverse of the element 82 is four inches and the oscillations of the element 82 are 50/min., the resulting mesh will be angled at 30° from the longitudinal axis of the machine. Fifty-four strands will be wrapped around 54 pins on one chain and the chains will travel 27 inches before the fifty-four strands are wrapped around the pins on the other chain. This process continues with a 27 inch overlap of the mesh on each half stroke of the element 82.

The longer the element 82, the slower the required oscillation. If the element 82 is oscillated twice normal speed, two strands would be wrapped on each pin rather than one strand on each pin. Similarly if the element 82 were twise the normal length with 108 guides, but oscillatory rate was normal, two strands would be wrapped on each pin.

A plurality of strands on each pin creates a thicker mesh, sandwiches the centre strands and presents greater surface for adhering the strands together, so that the product is useful as a rug backing or the like.

In the making of reinforced paper, directly on a papermaking machine, for example, of the Fourdrinier type having an endless porous carrier upon which the paper stock is laid, the machine 28 may be installed normal to the path of the Fourdrinier carrier, or wire. The parallel chain stretches 49 and 50, carrying the netting 25 are normal to the path of the upper stock until proximate the path, and then are guided by suitable sprockets, and by channel pieces, such as 36 and 37 which are of arcuate form, through an angular path of 90° into the path of the stock to travel along with the paper stock. The channel piece on the inside of the curved path is similar in width to the channel pieces 144 or 145 and the links are crowded on the inside turn, as heretofore explained, while the links on the outside of the turn are not so crowded.

We claim:
1. A machine for making a non woven, criss-cross strand netting of predetermined full width, said machine comprising:
    endless, strand-carrier means including a pair of laterally spaced stretches, having loop receiving elements spaced therealong, mounted to advance longitudinally along a path through said machine for supporting said netting in relatively narrow spaced parallelism during looping in a looping zone, for spreading said netting to said full width in a spreading zone and for supporting said full width netting in relatively widely spaced parallelism in a stripping zone;
    strand looping means, including a longitudinally extending support, having a plurality of strand feed guides spaced therealong, mounted to move laterally in said looping zone for alternately looping said strands on the loop receiving elements of said relatively narrowly spaced stretches, and mounted to move longitudinally in said looping zone for alternately advancing on each opposite side of said path along with the adjacent stretch of said relatively narrowly spaced stretches;
    strand supply means for supplying a multiplicity of individual strands to said strand feed guides, and
    power mechanism for advancing said pair of stretches of said strand carrier means along said path and for moving said strand feed guide support laterally and longitudinally in said strand looping zone in synchronism to form a cross-cross strand netting on said loop receiving elements.

2. A machine as specified in claim 1 wherein said endless, strand-carrier means comprises a pair of chains disposed in a common plane, each trained around sprockets rotatable on axes normal to said common plane and wherein said loop receiving elements are pins projecting from said chains in a direction generally normal to said planes.

3. A machine as specified in claim 1 plus means mounted across said path in said stripping zone, and operable on said netting for joining together the crossing points of the criss-cross strands thereof to form a unitary strippable web.

4. A machine as specified in claim 1 wherein said power mechanism includes means operably connected to said member for accelerating the same at each opposite side of said path to move rapidly through the spaces between elements around the said loop receiving elements and back through the next successive spaces.

5. A machine as specified in claim 1 wherein said strand looping means includes a strand looping member carrying said feed guide support above said path and mounted to pivot on a fixed pivot axis below, and in parallelism with, the longitudinal centre line of said path, whereby the lateral arcuate path of pivoting of said support is well above the criss-cross netting being formed thereby.

6. A machine as specified in claim 1 wherein said endless carrier means comprises a pair of endless members having said laterally spaced stretches extending continuously along said path, said stretches being closely spaced in parallelism in said looping zone, diverging away from each other in said spreading zone to exert tension on said criss-cross strands for widening said netting and being relatively widely spaced in parallelism in said stripping zone for advancing said netting at said predetermined full width.

7. A machine as specified in claim 1 plus a freely rotatable holddown roll mounted at the junction of each said looping zone stretch with the divergent stretch in extension thereof, in said spreading zone said roll having a toothed circumferential face, the teeth thereof extending into the spaces between said loop receiving elements to prevent dislodgement of the strands looped therearound.

8. A machine as specified in claim 1 plus mesh reduction means associated with said stripping zone for reducing the area of the meshes of the full width criss-cross netting advancing therealong and for moving the angularly disposed strands thereof more closely together to provide a finer mesh netting of said full width.

9. A machine as specified in claim 1, plus a pair of soft, yieldable belts each extending along the outside of one of said widely spaced parallel stretches, in said stripping zone in engagement with strands looped on said elements for controlling tension thereof.

10. A machine as specified in claim 8 wherein said endless carrier means is in the form of chain links pivotally connected to each other and said mesh reduction means includes mechanism operable along said widely spaced parallel stretches in said stripping zone for crowding said chain links into folded condition while advancing therealong for reducing the longitudinal spacing between the loop receiving elements mounted thereon and reducing the area of the meshes of said criss-cross strand netting.

11. A machine as specified in claim 2 plus means proximate the ends of said relatively widely spaced stretches in said stripping zone for slightly converging the same toward each other to permit stripping of said netting from said pin elements without damaging said netting.

12. A machine as specified in claim 1 plus a pair of oppositely disposed rolls of adhesive coated material having a nip in the path of the netting advancing along said widely spaced, generally parallel stretches for receiving said netting and means on said machine proximate said nip, at the terminal end of said parallel stretches, for slightly converging said stretches to permit said rolls to strip said netting from said elements.

13. A machine for making a non-woven, criss-cross strand netting of predetermined full width, said machine comprising:
  a pair of endless chains having a pair of parallel stretches, closely spaced apart at a distance substantially less than said full width, a pair of divergent stretches and a pair of widely spaced parallel stretches each in extension of the other and mounted to advance along a path, said chain having a plurality of closely spaced, loop receiving pins upstanding therefrom;
  a strand looping member including a support mounted to oscillate laterally, and reciprocate longitudinally of said path substantially in the plane of said closely spaced parallel stretches and having a plurality of closely spaced strand feed guides mounted along said support, the tips of said guides passing through the spaces between said advancing elements proximate each opposite side of said path;
  a plurality of large strand supply packages mounted outside said machine each supplying an individual strand to one of the guides on said member, and
  power mechanism for advancing said chains unidirectionally and oscillating said feed member in synchronism therewith, said mechanism including means accelerating said support proximate each opposite side of said path for rapidly looping said strands first around the pins on one said stretch and then around the pins on the other said stretch, and
  including means for longitudinally reciprocating said support proximate each opposite side of said path for advancing the same at substantially the speed of said chains during said looping.

14. The method for making non-woven, criss-cross strand netting of a predetermined full width on a pair of laterally, spaced apart rows of longitudinally spaced, loop-receiving elements which define a longitudinal path for said netting which comprises the steps of:
  advancing said rows unidirectionally, each in a closed loop and both in a common plane through a looping zone, a spreading zone, and a stripping zone on said path;
  closely spacing said rows in parallelism at a distance apart, substantially less than said full width in said looping zone on said path;
  alternately looping a plurality of individual strands first around elements in one said row and then around elements in the other said row, while said rows are closely spaced in said looping zone, to form a relatively narrow criss-cross netting therebetween;
  then diverging said advancing rows, in rear of said looping zone, in said spreading zone along said path, until they are spaced apart the full width of the said netting;
  and then converging said advancing rows in rear of said spreading zone, in a stripping zone along said path until said rows are again in parallelism at a distance apart substantially equal to the said predetermined width of said netting.

15. The method for making non-woven, open meshed criss-cross strand netting of predetermined width by means of a pair of parallel chains having upstanding pins thereon which comprises the steps of:
  advancing said chains, in parallelism in a single common flat plane and spaced apart a distance substantially less than the predetermined width of said netting;
  looping a plurality of individual strands alternately around the pins on one chain and then around the pins of the other chain, while the chains are advancing unidirectionally and while the chains are so closely spaced apart;
  then spreading said advancing chains apart in said common plane to widen the criss-cross netting formed thereon by said strands, then converging said advancing chains again into parallelism in said common plane with said chains spaced apart a distance substantially equal to said predetermined width to form said open meshed criss-cross strand netting, and
  then securing together at least the crossing points of said netting before stripping the same from said pins.

16. A method as specified in claim 15, plus the step of:
  slowing the advance of said criss-cross strand, open meshed netting along said path in said stripping zone to cause the distances between said criss-cross strands to be reduced to less than the distances between said pins, thereby producing a finer mesh in said full width netting.

17. The method for making meshed, criss-cross, strand netting of predetermined width by laterally traversing a longitudinally extending multiple strand looping member relative to a longitudinally extending pair of laterally spaced rows of loop receiving elements advancing along a path, said method comprising the steps of:
  closely spacing said rows substantially in parallelism at a distance apart, substantially less than said full width, to support a criss-cross strand netting of substantially less than said full width while forming a relatively short traverse path for said looping member;
  traversing said multiple strand looping member back and forth on said relatively short traverse path at relatively high speed to form said network on said closely spaced parallel rows of advancing elements;
  reciprocating said looping member longitudinally to advance with the adjacent row of said elements proximate each opposite end of said traverse path and to retract proximate the central portion of said traverse path, diverging said pair of laterally spaced rows of advancing loop receiving elements, in a zone of said path beyond said looping member to spread said network to said full width, and then converging said pair of laterally spaced rows of advancing loop receiving elements further along said path again into substantial parallelism for stabilizing said network at said predetermined width.

18. A machine for making a non-woven, criss-cross strand structure, said machine comprising:

endless, strand-carrier means having a pair of closely spaced stretches mounted to advance in the same direction at a predetermined distance apart, each having a plurality of spaced, loop receiving elements mounted thereon;

strand looping means including a support having a plurality of individual strand feed guides spaced therealong, said means including pivot means for traversing said guides back and forth from a position outside the elements on one said stretch, through the spaces between said elements to a position outside the elements on the other said stretch, and including reciprocation means for advancing said guides in the direction of advance of said stretches when approaching each said position, and power mechanisms advancing said carrier means and traversing and reciprocating said strand feed guides in synchronism for alternately looping said strands around the advancing elements on one said stretch and then around the advancing elements on the other said stretch.

19. A machine for making a full width non-woven, criss-cross strand structure, said machine comprising:

endless, strand-carrier means having a pair of closely spaced stretches mounted to advance in the same direction at a predetermined distance apart, substantially less than said full width of said criss-cross strand structure, each stretch having a plurality of spaced loop receiving elements mounted thereon;

a pair of diverging stretches, each in extension of one of said stretches, forming part of said endless strand-carrier means and having corresponding loop receiving elements thereon, said diverging stretches spreading said criss-cross strand structure to its full width;

a strand looping member having a support and having a plurality of individual strand feed guides spaced along said support; said member having pivoting means to traverse said guides back and forth relative to said closely spaced stretches from a position outside the elements on one said stretch, through the spaces between said elements to a position outside the elements on the other said stretch, and power mechanisms advancing said carrier means and traversing said strand looping member in synchronism for alternately looping said strands around the advancing elements on one said stretch and then around the advancing elements on the other said stretch.

20. The method for making a full width, non-woven, criss-cross strand structure on a pair of unidirectionally advancing, spaced apart rows of loop receiving elements, which comprises:

closely spacing said rows substantially in parallelism at a distance apart, spaced less than said full width;

simultaneously looping a plurality of individual strands supplied from a strand supply source, first around elements in one said row and then around elements in the other said row, while in said closely spaced parallelism, to form a relatively narrow criss-cross strand structure therebetween which has no strand motion relative to said pins but continues to pull strand from said supply source.

then diverging said rows from each other to cause each strand of said structure to be pulled further around the element on which it is looped until said rows are spaced apart the full width of said structure and said structure is at said full width.

21. The method for making a full width, non-woven, criss-cross strand structure on a pair of spaced apart rows of loop receiving elements advancing unidirectionally at a predetermined speed, which comprises:

closely spacing said rows at a distance apart, substantially less than said full width;

simultaneously looping a plurality of individual strands supplied from a strand supply source, first around elements in one said row and then around elements in the other said row while advancing said plurality of individual strands alternately with each said row substantially at said predetermined speed to form a relatively narrow criss-cross strand structure between said rows and, after the formation of said narrow criss-cross strand structure on said rows, then spreading said rows into parallelism at a distance apart equal to said full width.

References Cited

UNITED STATES PATENTS

| 1,192,568 | 6/1916 | Scherf | 156—436 |
| 2,614,054 | 11/1949 | Baisch et al. | 156—439 X |
| 2,812,797 | 11/1957 | Estee et al. | 156—440 |
| 2,962,080 | 11/1960 | Hirsch | 156—440 |
| 3,123,512 | 3/1964 | Mercer | 156—441 X |

FOREIGN PATENTS

| 25,158 | 11/1914 | Great Britain. |
| 1,080,293 | 3/1960 | Germany. |
| 672,757 | 10/1963 | Canada. |

EARL M. BERGERT, *Primary Examiner.*

J. P. MELOCHE, W. E. HOAG, *Assistant Examiners.*